US012802902B2

(12) United States Patent
Jur et al.

(10) Patent No.: US 12,802,902 B2
(45) Date of Patent: Nov. 17, 2026

(54) SECONDARY ARCING CONTACT FOR AN ELECTRICAL SWITCH

(71) Applicant: Eaton Intelligent Power Limited, Dublin (IE)

(72) Inventors: Arthur James Jur, Cleveland, TN (US); Abhishek Rao, Pune (IN); Durgesh Kumar Pandey, Gonda (IN)

(73) Assignee: Eaton Intelligent Power Limited, Dublin (IE)

( * ) Notice: Subject to any disclaimer, the term of this patent is extended or adjusted under 35 U.S.C. 154(b) by 187 days.

(21) Appl. No.: 18/441,671

(22) Filed: Feb. 14, 2024

(65) Prior Publication Data

US 2025/0259805 A1 Aug. 14, 2025

(51) Int. Cl.
*H01H 9/38* (2006.01)

(52) U.S. Cl.
CPC .................................... *H01H 9/38* (2013.01)

(58) Field of Classification Search
CPC ............ H01H 9/38; H01H 9/30; H01H 9/383; H01H 9/386
USPC .......................................................... 218/146
See application file for complete search history.

(56) References Cited

U.S. PATENT DOCUMENTS

| | | | | |
|---|---|---|---|---|
| 3,213,247 | A | 10/1965 | Stene | |
| RE28,243 | E | 11/1974 | Rys | |
| 4,137,433 | A | 1/1979 | Erickson | |
| 4,713,504 | A * | 12/1987 | Maier | H01H 9/383 218/21 |
| 2018/0366287 | A1 | 12/2018 | Vaishnavi | |
| 2023/0045653 | A1 * | 2/2023 | Hammer | H01H 9/0016 |

OTHER PUBLICATIONS

Eaton Bolted contact switches, Publication No. PA008002EN/Z19816, Mar. 2018, 4 pages total.
Pringle switch and replacement parts, Publication No. TD00808001E/Z27838, Aug. 2023, 16 pages total.

* cited by examiner

*Primary Examiner* — Lheiren Mae A Caroc
(74) *Attorney, Agent, or Firm* — DiBerardino McGovern IP Group LLC

(57) ABSTRACT

A switch includes: a first stationary electrical contact; a second stationary electrical contact; a movable electrical contact assembly attached to the second stationary electrical contact and configured to separate from the first stationary electrical contact to open the switch; a first arcing contact on the movable electrical contact assembly; a second arcing contact on the first stationary electrical contact; and a secondary arcing contact electrically connected to the movable electrical contact assembly. The secondary arcing contact is connected to the second arcing contact when the switch is closed and remains connected to the second arcing contact during at least part of an opening operation of the switch.

20 Claims, 8 Drawing Sheets

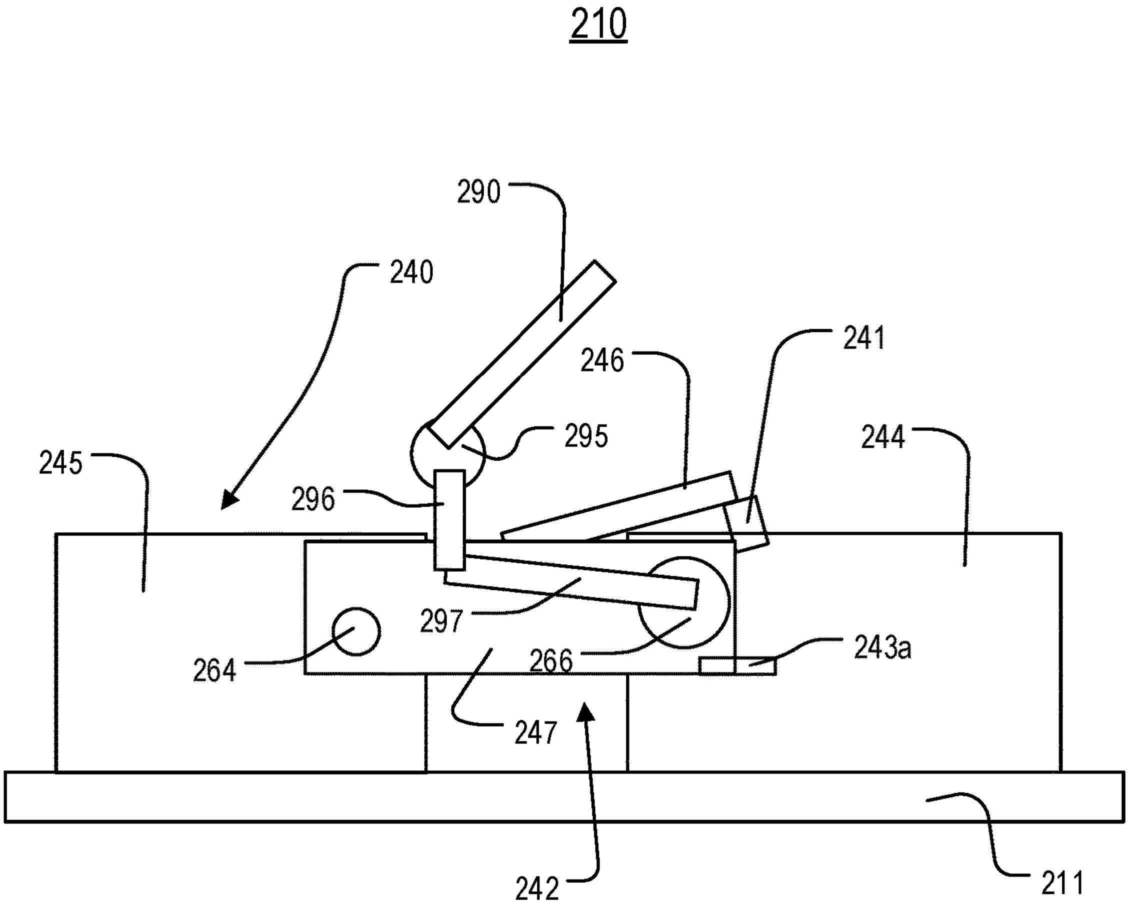
FIG. 2B
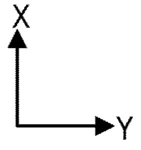

SECONDARY ARCING CONTACT FOR AN ELECTRICAL SWITCH

TECHNICAL FIELD

This disclosure relates to a secondary arcing contact for an electrical switch.

BACKGROUND

An electrical switch includes stationary electrical contacts and a movable electrical contact. The state of the electrical switch is changed from ON to OFF and OFF to ON by moving the movable electrical contact relative to the stationary electrical contacts. The stationary electrical contacts may be enclosed in a housing.

SUMMARY

In one aspect, a switch includes: a first stationary electrical contact; a second stationary electrical contact; a movable electrical contact assembly attached to the second stationary electrical contact and configured to separate from the first stationary electrical contact to open the switch; a first arcing contact on the movable electrical contact assembly; a second arcing contact on the first stationary electrical contact; and a secondary arcing contact electrically connected to the movable electrical contact assembly. The secondary arcing contact is connected to the second arcing contact when the switch is closed and remains connected to the second arcing contact during at least part of an opening operation of the switch.

Implementations may include one or more of the following features.

The secondary arcing contact may be attached to the movable electrical contact assembly with an elastic connection that is configured to apply a force to the secondary arcing contact. The force may be greatest when the switch is closed. The secondary arcing contact may extend from a first end to a second end, the first end may be attached to a rotation point, the second end may be connected to the second arching contact when the switch is closed and remains connected to the second arcing contact during at least part of the opening operation of the switch, and the elastic connection may be attached to the secondary arcing contact between the first end and the second end.

The secondary arcing contact may be electrically connected to the movable electrical contact assembly by a braided electrical wire.

The first arcing contact, the second arcing contact, and the secondary arcing contact may have a lower electrical conductivity than the first stationary electrical contact, the second stationary electrical contact, and the movable electrical contact assembly.

The movable electrical contact assembly may be attached to the second stationary electrical contact at a pivot point, the movable electrical contact assembly may be configured to rotate about the pivot point in an arc, and the secondary arcing contact may remain connected to the second arcing contact at least until the first arcing contact connects to the second arcing contact.

The movable electrical contact assembly may include: a first contact portion, and a second contact portion. The first contact portion may be on a first side of the second stationary electrical contact, and the second contact portion may be on a second side of the second stationary electrical contact.

The switch also may include a pressure apparatus coupled to the movable electrical contact assembly, and the opening operation may begin when the pressure apparatus is released. The switch also may include an operating interface coupled to the pressure apparatus, the operating interface being operable to release the pressure apparatus.

The switch also may include a support, and the first stationary electrical contact and the second stationary electrical contact may be mounted on the support in a line.

In another aspect, an apparatus includes: a movable electrical contact assembly configured to move relative to a stationary electrical contact; an arcing contact attached to the movable electrical contact assembly; a secondary arcing contact electrically connected to the movable electrical contact assembly; and an elastic connection attached to the movable electrical contact assembly and the secondary arcing contact.

Implementations may include one or more of the following features.

The secondary arcing contact may be electrically connected to the movable electrical contact assembly through an electrically conductive element. The electrically conductive element may be flexible.

The movable electrical contact assembly may include a first contact portion and a second contact portion, and the secondary arcing contact may be between the first contact portion and the second contact portion.

The secondary arcing contact and the arcing contact may include a first electrically conductive material, and the movable electrical contact assembly may include a second electrically conductive material that has a higher electrical conductivity than the first electrically conductive material.

In another aspect, a system includes: a stationary electrical contact; a movable electrical contact assembly configured to move relative to the stationary electrical contact; a first arcing contact on the movable electrical contact assembly; a second arcing contact on the stationary electrical contact; an electrical element electrically connected to the movable electrical contact assembly; an elastic connection attached to the movable electrical contact assembly; and a secondary arcing contact connected to the electrical element and the elastic connection.

Implementations of any of the techniques described herein may include an apparatus, a device, a switch, a system, and/or a method. The details of one or more implementations are set forth in the accompanying drawings and the description below. Other features will be apparent from the description and drawings, and from the claims.

DRAWING DESCRIPTION

FIG. 2B is a side view of a pressure contact switching system that includes the switch module of FIG. 2A.

DETAILED DESCRIPTION

Figure 1:
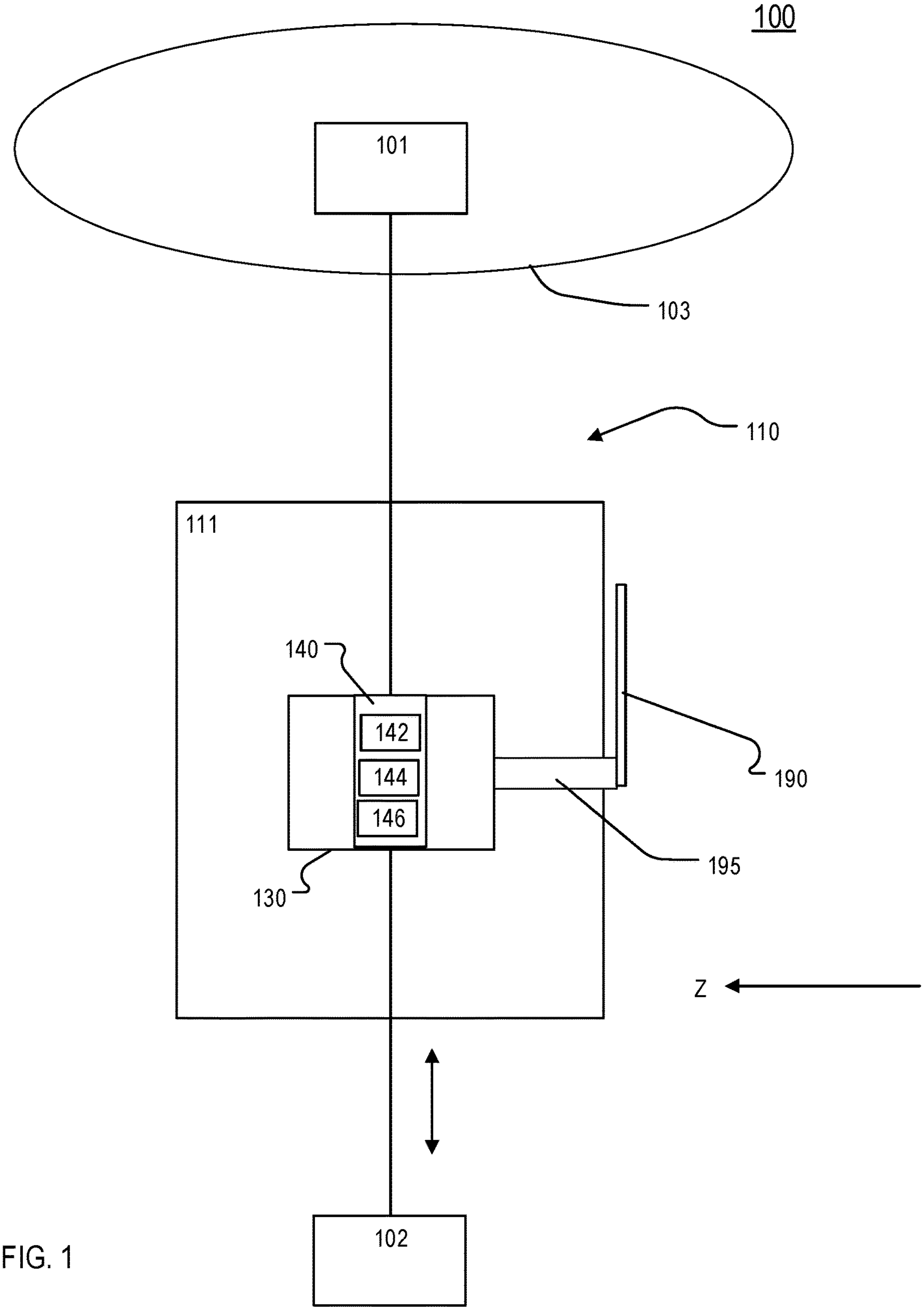
FIG. 1 is a block diagram of a switching system.

FIG. 1 is a block diagram of a switching system 110 that is between two devices 101 and 102. In the discussion below, the device 101 is a source 101 and the device 102 is a load 102. However, devices 101 and 102 may be any type of electrical device. For example, the device 101 may be a load and the device 102 may be a source. The switching system 110 may be, for example, a safety switch, a shunt trip safety switch, a fused and/or power-circuit device, or a molded case circuit breaker. The switching system 110 includes a switch apparatus 130. The switch apparatus 130 may be, for example, a bolted contact switch, a high pressure butt-type contact switch, or a bolted pressure switch apparatus.

The switch apparatus 130 includes a switch module 140 that controls the electrical connection between the source 101 and the load 102. The switch module 140 includes a stationary contact 144 and a movable contact 142 that moves relative to the stationary contact 144 to open or close the switch module 140. The contacts 142 and 144 are electrically conductive. When the movable contact 142 is not electrically connected to the stationary contact 144, the switch module 140 is OFF or open, current cannot flow through the switch module 140, and the source 101 is disconnected from the load 102. When the movable contact 142 is electrically connected to the stationary contact 144, the switch module 140 is ON or closed, current can flow through the switch module 140, and the source 101 is electrically connected to the load 102.

As discussed below, the switch module 140 includes a secondary arcing contact 146 that provides an alternate current path during an opening operation of the switch module 140. The secondary arcing contact 146 reduces and/or eliminates contact welding that could otherwise occur between the movable contact 142 and the stationary contact 144 during the opening operation.

Before discussing examples of the switch module 140 in more detail, an overview of various components of the system 100 is provided.

The source 101 is any kind of AC power source. For example, the source 101 may be a generator, a power plant, a distributed energy resource (DER), or a node or feeder in an AC power grid. A DER is an electricity-producing resource and/or a controllable load. Examples of DERs include, without limitation, solar-based energy sources such as, for example, solar panels and solar arrays; wind-based energy sources, such as, for example, wind turbines and windmills; combined heat and power plants; rechargeable sources (such as batteries); natural gas-fueled generators; electric vehicles; and controllable loads, such as, for example, some heating, ventilation, air conditioning (HVAC) systems, and electric water heaters.

The load 102 is any device or system that consumes, transfers, absorbs, and/or produces electrical power. For example, the load 102 may be a motor; a lighting system; a distributed energy resource (DER); an uninterruptable power supply, a capacitor, a power-factor correction device (such as a capacitor bank), or a transformer. The load 102 may be located at a customer site, such as, for example, a residence or an industrial facility. The load 102 may include more than one device.

In the example of FIG. 1, the source 101 is part of a grid or electrical power distribution network 103. The electrical power distribution network 103 may be, for example, a multi-phase electrical power grid that provides electricity to industrial, commercial, and/or residential customers. The AC electrical power distribution network 103 distributes AC electrical power that has a fundamental frequency of, for example, 50 or 60 Hertz (Hz). The AC electrical power distribution network 103 may be low-voltage (for example, up to 1 kilovolt (kV)), medium-voltage or distribution voltage (for example, between 1 kilovolts (kV) and 35 kV), or high-voltage (for example, 35 kV and greater).

The distribution network 103 may include more than one sub-grid or portion. For example, the distribution network 103 may include AC micro-grids, AC area networks, or AC spot networks that serve particular customers. These sub-grids may be connected to each other via switches and/or other devices to form the network 103. Moreover, sub-grids within the network 103 may have different nominal voltages. For example, the network 103 may include a medium-voltage portion connected to a low-voltage portion through a distribution transformer.

All or part of the network 103 may be underground. The network 103 may include additional components and devices such as, for example, one or more transmission lines, distribution lines, power distribution or substation transformers, electrical cables, and/or any other mechanism for transmitting electricity.

The switch apparatus 130 is supported and/or enclosed in a housing 111. The state of the switch apparatus 130 is determined by the state of the switch module 140. The switch module 140 is any type of switch that has at least an ON state and an OFF state. For example, the switch module 140 may be a double make, double break switch that includes a movable conductor and that interacts with two stationary contacts, a knife-type switch, a bolted pressure contact switch, a high-pressure butt-type contact switch, or a blade-type switch. The switch module 140 is configured for repeated operation. For example, the switch module 140 may be opened and closed repeatedly over its lifetime.

The switch module 140 is capable of interrupting current having an amplitude that is appropriate for the application of the switching system 110. The rating of the switching system 110 may be, for example, 30 Amperes (A), 60 A, 100 A, 200 A, 400 A, 600 A, 800 A, 1200 A, or greater. Although only one switch module 140 is shown in FIG. 1, the switch apparatus 130 may include more than one switch module 140. For example, the switch apparatus 130 may be a three-phase switch apparatus that includes three instances of the switch module 140, one for each phase. In some implementations, the switch apparatus 130 is a multi-phase switch apparatus that includes more than one instance of the switch module 140 for each phase.

The switching system 110 also includes an operating interface 190 and a driving assembly 195 coupled to the operating interface 190. The driving assembly 195 is coupled to the movable contact 142 such that the state of the switch module 140 is controllable with the operating interface 190. In implementations that include more than one instance of the switch module 140, the driving assembly 195 is coupled to all of the switch modules 140 such that manipulating the operating interface 190 changes the state of all of the switch modules 140 simultaneously to thereby also change the state of the switch apparatus 130.

The operating interface 190 is any type of interface that has at least two stable states or positions and is accessible from an exterior of the support or housing 111. For example, the operating interface 190 may be a handle that moves through a range of motion between two endpoints but is only stationary at the endpoints, where one endpoint corresponds to the switch apparatus 130 being in the OFF state and the other endpoint corresponds to the switch apparatus 130 being in the ON state.

The switching system 110 also may include a fuse holding assembly (not shown). The fuse holding assembly is any type of assembly that holds fuses. For example, the fuse holding assembly may be one or more fuse clips. The fuse holding assembly may be configured to allow removal and replacement of a fuse that has operated. In implementations that include a fuse holding assembly, the switching system 110 may be shipped or transported without the fuses and the fuses may be installed by the end-user or manufacturer. However, the switching system 110 may be used without fuses and may be constructed without a fuse holding assembly.

Figure 2A:
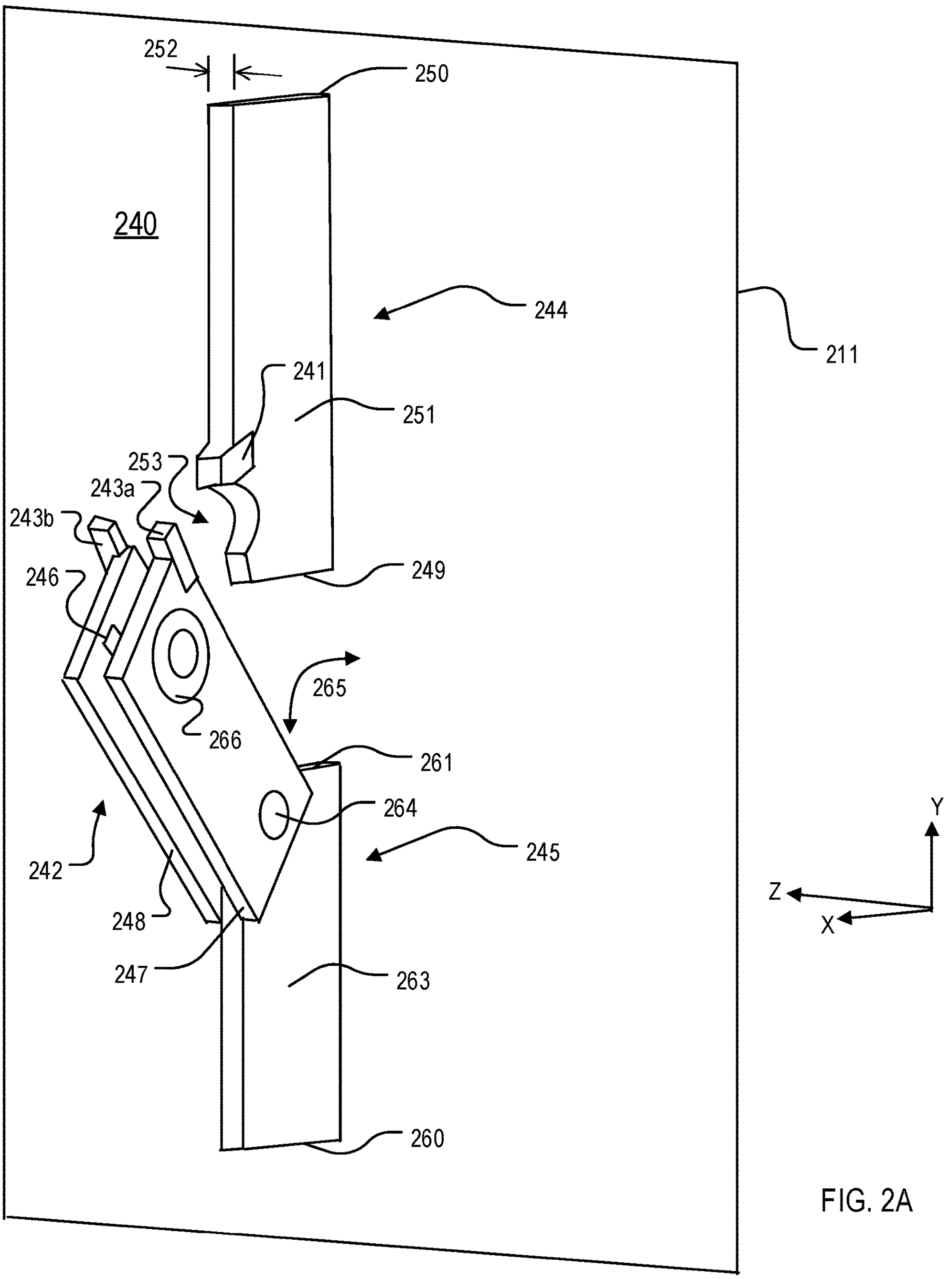
FIG. 2A is a perspective view of a switch module.

FIG. 2A is a perspective view of a switch module 240. The switch module 240 is a bolted pressure contact switch that includes a secondary arcing contact 246. FIG. 2A shows the switch module 240 in a fully open state or fully open position.

The switch module 240 includes a movable contact assembly 242 and stationary contacts 244 and 245. In the example shown in FIG. 2A, the stationary contacts 244 and 245 are solid bars of electrically conductive material. Other implementations are possible. For example, the stationary contacts 244 and 245 may be blades or rods of electrically conductive material.

The stationary contacts 244 and 245 are attached to a support 211. The support 211 may be, for example, a mounting board, housing, enclosure, or other structure. The support 211 includes a material that is not electrically conductive, such as, for example, a polymer. The stationary contacts 244 and 245 are attached to the support 211 with one or more mechanical fasteners (for example, brackets, screws, and/or bolts) and/or with a bonding agent (for example, an adhesive).

The stationary contact 244 extends in the Y direction from a first end 249 to a second end 250. The stationary contact 244 has a generally planar surface 251 that extends in the X-Y plane and has a thickness 252 in the Z direction. The stationary contact 244 also includes a substantially planar surface opposite the surface 251 that is not shown in FIG. 2A. The stationary contact 244 includes a recessed region 253 near the end 249.

The stationary contact 244 also includes an arcing contact 241 that extends from an upper part of the stationary contact 244. The arcing contact 241 is fixedly attached to the stationary contact 244 and does not move relative to the stationary contact 244. For example, the arcing contact 241 may be bolded, welded, and/or brazed to the stationary contact 244.

The stationary contact 245 extends in the Y direction from an end 260 to an end 261. The stationary contact 245 includes a substantially planar surface 263 that extends in the X-Y plane. The stationary contact 245 also includes a substantially planar surface that is opposite the surface 263 and is not shown in FIG. 2A. The stationary contact 244 and the stationary contact 245 are positioned along a line in the Y direction. The stationary contacts 244 and 245 do not make direct physical contact.

The movable contact assembly 242 includes a first contact portion 247 and a second contact portion 248. Each contact portion 247, 248 is an electrically conductive bar or plate. The contact portions 247 and 248 are separated from each other in the Z direction and do not make direct physical contact. The contact portions 247 and 248 are mounted to the stationary contact 245 at a pivot point 264. The first contact portion 247 and second contact portion 248 are mounted on opposite sides of the stationary contact 245, with the first contact portion 247 being on the side of the surface 263.

The pivot point 264 passes through the first contact portion 247, the second contact portion 248, and the stationary contact 245 in the Z direction. The pivot point 264 is any type of device that allows the movable contact assembly 242 to rotate relative to the stationary contact 245 along an arc 265 in the X-Y plane. For example, the pivot point 264 may be a rivet, a bolt, or a screw. The movable contact assembly 242 also includes a pressure apparatus 266 that passes through the first contact portion 247 and the second contact portion 248 in the Z direction. The pressure apparatus 266 is any device that can press the contact portions 247 and 248 toward each other. The pressure apparatus 266 may be, for example, a bolt that passes through the contact portions 247 and 248 in the Z direction and is secured by a nut or other fastener.

Each contact portion 247, 248 includes a respective arcing contact 243*a*, 243*b*. Each arcing contact 242*a*, 243*b* is fixedly attached to its respective contact portion 247, 248. For example, the arcing contact 243*a* may be bolted, welded, and/or brazed to the contact portion 247, and the arcing contact 243*b* may be bolted, welded, and/or brazed to the contact portion 248. The secondary arcing contact 246 is between the first contact portion 247 and the second contact portion 248. The secondary arcing contact 246 is electrically connected to the first contact portion 247 and/or the second contact portion 248.

The stationary contacts 244, 245 and the contact portions 247, 248 are made of an electrically conductive material, such as, for example, copper, gold, silver, or a metal alloy. The secondary arcing contact 246 and the arcing contacts 241, 243*a*, and 243*b* are also made of an electrically conductive material. The secondary arcing contact 246; the arcing contacts 243*a*, 243*b*; and the arcing contact 241 may be made of the same material. The arcing contacts 243*a*, 243*b*, 241, and the secondary arcing contact 246 are not necessarily the same material as the stationary contacts 244, 245 and the contact portions 247, 248. Moreover, the arcing contacts 241, 246, 243*a*, and 243*b* may be made of a material with a higher impedance (or lower electrical conductivity) that the material of the stationary contacts 244, 245 and the contact portions 247, 248 to reduce electrical loses during ordinary operation of the switch module 240. The arching contacts 241, 243*a*, 243*b* and the secondary arcing contact 246 may include, for example, copper, silver, or a metal alloy (for example, copper-tungsten, silver-tungsten) or any other electrically conductive material with high melting point.

FIG. 2B is a side view of a pressure contact switching system 210 that includes the switch module 240 and the support 211. The switch module 240 is in the closed state in FIG. 2B. The switching system 210 includes an operating interface 290 that is coupled to a shaft 295. The shaft 295 extends along the Z axis (into and out of the page in FIG. 2B). The shaft 295 is connected via mechanical linkages 296 and 297 to the pressure apparatus 266.

To open the switch module 240, the operating interface 290 is manipulated and the shaft 295 rotates in the X-Y plane, moving the linkages 296 and 297. The linkage 297 is mechanically connected to the pressure apparatus 266. Moving the linkage 297 loosens the pressure apparatus 266 (for example, a bolt or fastener), thereby releasing the contact portions 247 and 248 from the stationary contact 244 to begin the opening procedure. The operating interface 290 is also used to close the switch module 240. As the switch module 240 finishes closing, the movable contact assembly 242 continues to move thereby tightening the bolt or fastener of the pressure apparatus. This tightening process effectively bolts the movable contact assembly 242 to the stationary contacts 244 and 245, and the switch module 240 is closed.

Figure 3:
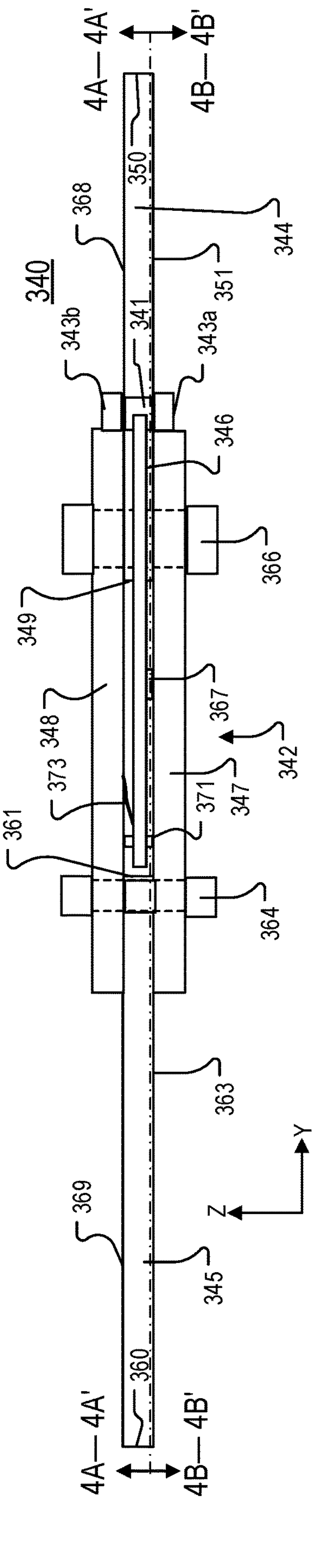
FIG. 3 is a top view of another switch module.

FIG. 3 is a top view of a switch module 340. The switch module 340 is similar to the switch module 240. The switch module 340 may be mounted on the support 211 (FIGS. 2A and 2B) and may be used in the switch apparatus 130 (FIG. 1). FIG. 3 shows the switch module 340 in the closed position.

The switch module 340 includes a first stationary contact 344 and a second stationary contact 345. The first stationary contact 344 and the second stationary contact 345 are electrically conductive elements, for example, the contacts 344 and 345 may be metal bars. The first stationary contact 344 includes opposing substantially planar surfaces 351 and 368 that extend in the X-Y plane. The second stationary contact 345 includes opposing substantially planar surfaces 363 and 369. An arcing contact 341 is affixed to the first stationary contact 344.

Figure 4A:
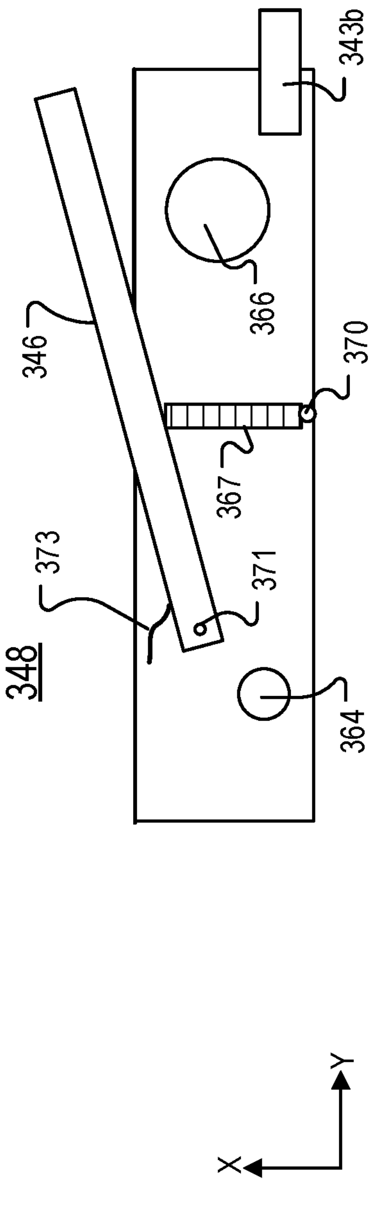
FIG. 4A is a side view of a contact portion along the line 4A-4A' of FIG. 3.
Figure 4B:
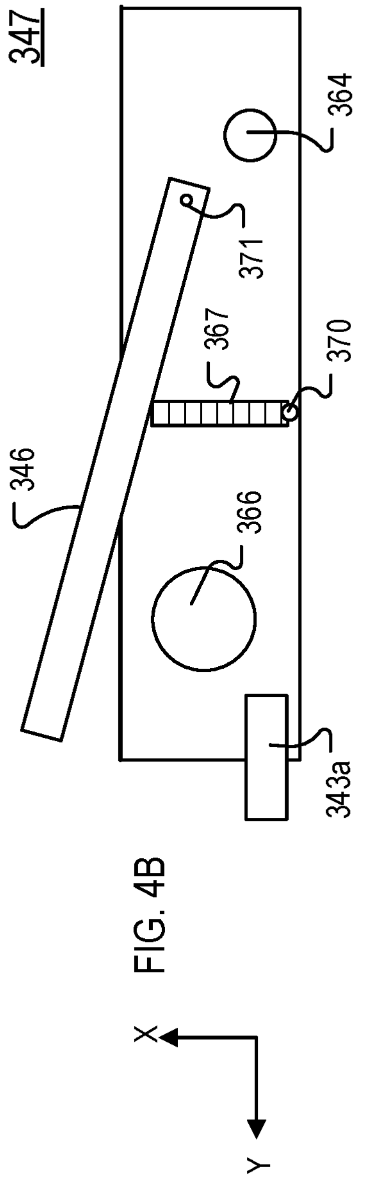
FIG. 4B is a side view of another contact portion along the line 4B-4B' of FIG. 3.

The switch module 340 also includes a movable contact assembly 342. The movable contact assembly 342 includes a first contact portion 347 and a second contact portion 348. The contact portions 347 and 348 are not directly connected to each other and are separated in the Z direction. Each contact portion 347, 348 includes a respective arcing contact 343*a*, 343*b*. Referring also to FIG. 4A, which is a side view of the contact portion 348 along the line 4A-4A' of FIG. 3, the arcing contact 343*b* extends from a lower portion of the contact portion 348. As shown in FIG. 4B, which is a side view of the contact portion 347 along the line 4B-4B' of FIG. 3, the arcing contact 343*a* is positioned similarly on the contact portion 347. The arcing contacts 343*a* and 343*b* are substantially parallel to each other.

A secondary arcing contact 346 is between the first contact portion 347 and 348. The secondary arcing contact 346 is an electrically conductive material, such as, for example, copper. The secondary arcing contact 346 may be, for example, a strip, a bar, or a rod.

The secondary arcing contact 346 is attached to the first contact portion 347 and/or the second contact portion 348 at a connection point 371. The connection point 371 is any type of connection that allows the secondary arcing contact 346 to move relative to the movable contact assembly 342. For example, the connection point 371 may be a rivet or a post.

The secondary arcing contact 346 is also attached to the first contact portion 347 by an elastic connection 367. The elastic connection 367 is attached to the first contact portion 347 and to the second contact portion 348 at a connection point 370. The elastic connection 367 is any device or assembly that has an equilibrium position, an extended state, and a compressed state. The elastic connection 367 exerts a force in direction(s) that is toward its equilibrium state.

The elastic connection 367 may be, for example, a spring (for example, a tension spring), an elastic strip or band, or a rubber member. The connection point 370 may be an opening that receives a hook on one end of the elastic connection 367, a pin, a screw or other fastener, and/or an adhesive.

The secondary arcing contact 346 is electrically connected to the second contact portion 348 by an electrically conductive element 373. The electrically conductive element 373 is any type of electrical element that maintains electrical connection between the contact portions 347 and 348 and the secondary arcing contact 346 throughout opening and closing of the switch module 340 and at all positions of the movable contact assembly 342. For example, the electrically conductive element 373 may be a braided copper wire or a cable that is soldered or brazed to the second contact portion 348 and to the secondary arcing contact 346.

In some implementations, the secondary arcing contact is electrically connected to the first contact portion 347 by the electrically conductive element 373. Moreover, the movable contact assembly 342 may include more than one electrically conductive element 373, and the secondary arcing contact 346 may be electrically connected to the contact portion 347 and the contact portion 348. Moreover, in some implementations, the secondary arcing contact 346 is electrically connected to two instances of the element 373, one of which is connected to the contact portion 347 and the other of which is connected to the contact portion 348.

The movable contact assembly 342 is attached to the second stationary contact 345 at a pivot apparatus 364. Portions of the pivot apparatus 364 (shown in dotted lines in FIG. 3 to indicate a hidden element) pass through the movable contact assembly 342 and the stationary contact 345 in the Z direction. The pivot apparatus 364 may be an axle, pin, bolt, or any other element that allows the movable contact assembly 342 to rotate relative to the second stationary contact 345 in the X-Y plane.

Figure 5:
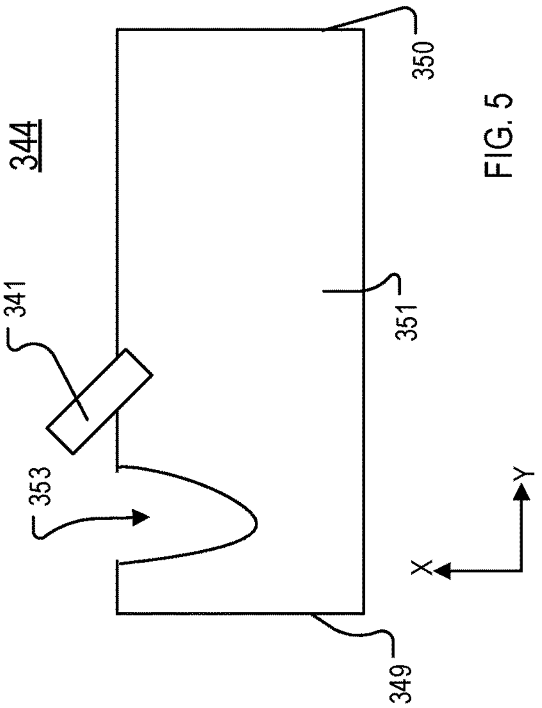
FIG. 5 is a side view of a stationary contact of the switch module of FIG. 3.

The movable contact assembly 342 also includes a pressure apparatus 366 that extends through the first and second contact portions 347, 348 in the Z direction. The pressure apparatus 366 may be a bolt. Referring also to FIG. 5, which is a side view of the first stationary contact 344, the stationary contact 344 includes a recess 353 that accommodates the pressure apparatus 366 when the switch module 340 is in the closed position and during portions of the opening process. The first stationary contact 344 does not restrain the pressure apparatus 366.

Referring again to FIG. 3, when the switch module 340 is in the closed position, the pressure apparatus 366 presses the first and second contact portions 347, 348 toward each other. The first contact portion 347 is in physical contact with the surface 351 of the first stationary contact 344 and the surface 363 of the second stationary contact 345. The second contact portion 348 is in physical contact with the surface 368 of the first stationary contact 344 and the surface 369 of the second stationary contact 345. Electrical current can flow through the switch module 380 when it is in the closed position.

Figure 6A:
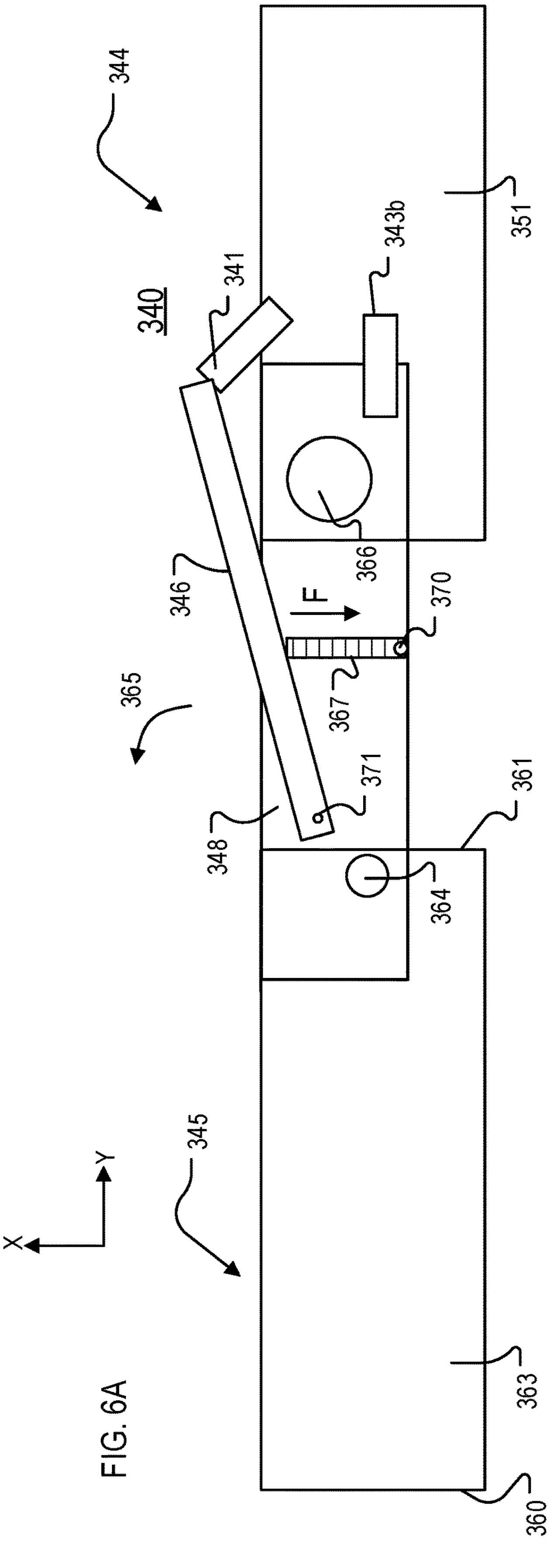
FIG. 6A is a side view of the switch module of FIG. 3 in a closed configuration.
Figure 6B:
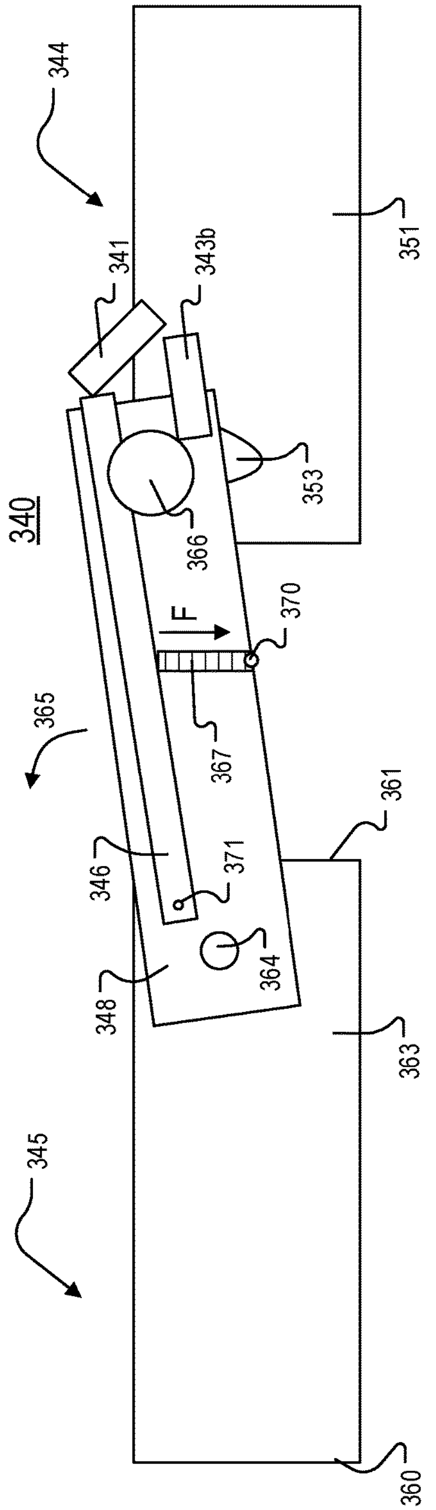
FIGS. 6B and 6C are side views of the switch module of FIG. 3 during an opening operation.
Figure 6C:
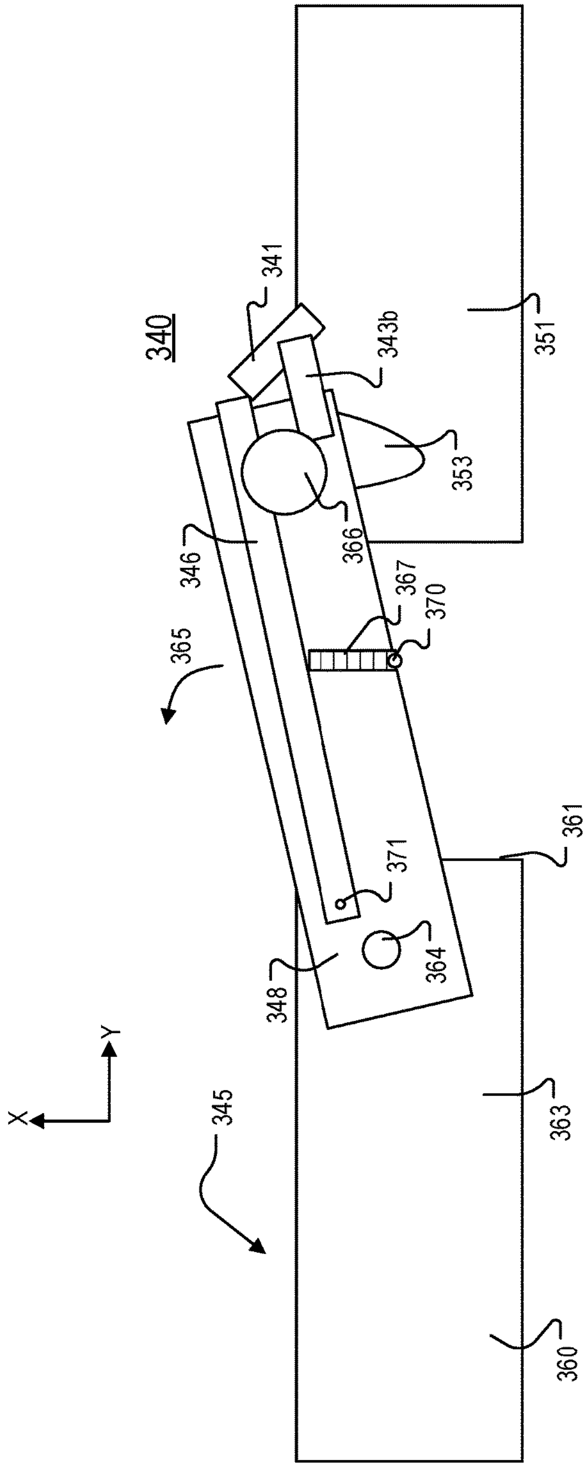

FIGS. 6A-6D show an opening operation to transition the switch module 340 from the closed position the fully open position. FIGS. 6A-6D are side cross-sectional views of the switch module 340 in the X-Y plane taken along the line 4A-4A' of FIG. 3. The stationary contacts 344 and 345 are in the foreground relative to the second contact portion 348. However, for simplicity, the contact portion 348 is shown in solid lines. Moreover, only the second contact portion 348 is shown in FIGS. 6A-6C. However, the first contact portion 347 moves in the same manner as discussed below with respect to the portion 348.

In FIG. 6A, the switch module 340 is closed. The first and second contact portions 347 and 348 are electrically connected to the stationary contacts 344 and 345. The pressure apparatus 366 applies force along the Z axis (into and out of the page) to press the first and second contact portions 347, 348 onto the stationary contact 344. This helps to ensure a secure electrical connection between the first and second contact portions 347, 348 and the stationary contact 344. The secondary arcing contact 346 is in physical and electrical contact with the arcing contact 341. The elastic connection 367 is in an extended or expanded state and exerts a force F on the secondary arcing contact 346 in a direction toward the equilibrium state of the elastic connection (substantially along the −X direction in FIG. 6A). The force F holds the secondary arcing contact 346 to the arcing contact 341. The impedance of the secondary arcing contact 346 and the arcing contact 341 is higher than the impedance of the contact portions 347, 348 such that only a nominal amount of current flows in the secondary arcing contact 346 and the arcing contact 341 when the switch module 340 is closed.

To open the switch module 340, the pressure apparatus 366 is loosened. The contact portions 347 and 348 move out of physical contact with the stationary contact 344. Referring to FIG. 6B, the contact portions 347 and 348 rotate about the pivot point along an arc 365. As the contact portions 347 and 348 rotate, the elastic connection 367 continues to seek the equilibrium position and continues to apply the force F to the secondary arcing contact 346. The force F holds the secondary arcing contact 346 in physical and electrical contact with the arcing contact 341. The secondary arcing contact 346 is electrically connected to the second contact portion 348 through the electrically conductive element 373, which is electrically connected to the stationary contact 345. Thus, current can continue to flow through the stationary contact 345, the first and second contact portions 347, 348, into the secondary arcing contact 346, and the stationary contact 344. In other words, current can flow in the switch module 340 via the secondary arcing contact 346 during the initial parts of the opening operation.

Referring to FIG. 6C, the first and second contact portions 347, 348 continue to rotate along the arc 365. The arcing contact 343*b* (and 343*a*) move into contact with the arc contact 341. Current may flow through the arcing contacts 343*a*, 343*b*, and 341. The elastic connection 367 is at its equilibrium position and the secondary arcing contact 346 may separate from the arcing contact 341. In some implementations, the elastic connection 367 is at its equilibrium position when the first and second contact portions 347, 348 are at an angle of about 25 degrees (°) relative to the Y axis.

Figure 6D:
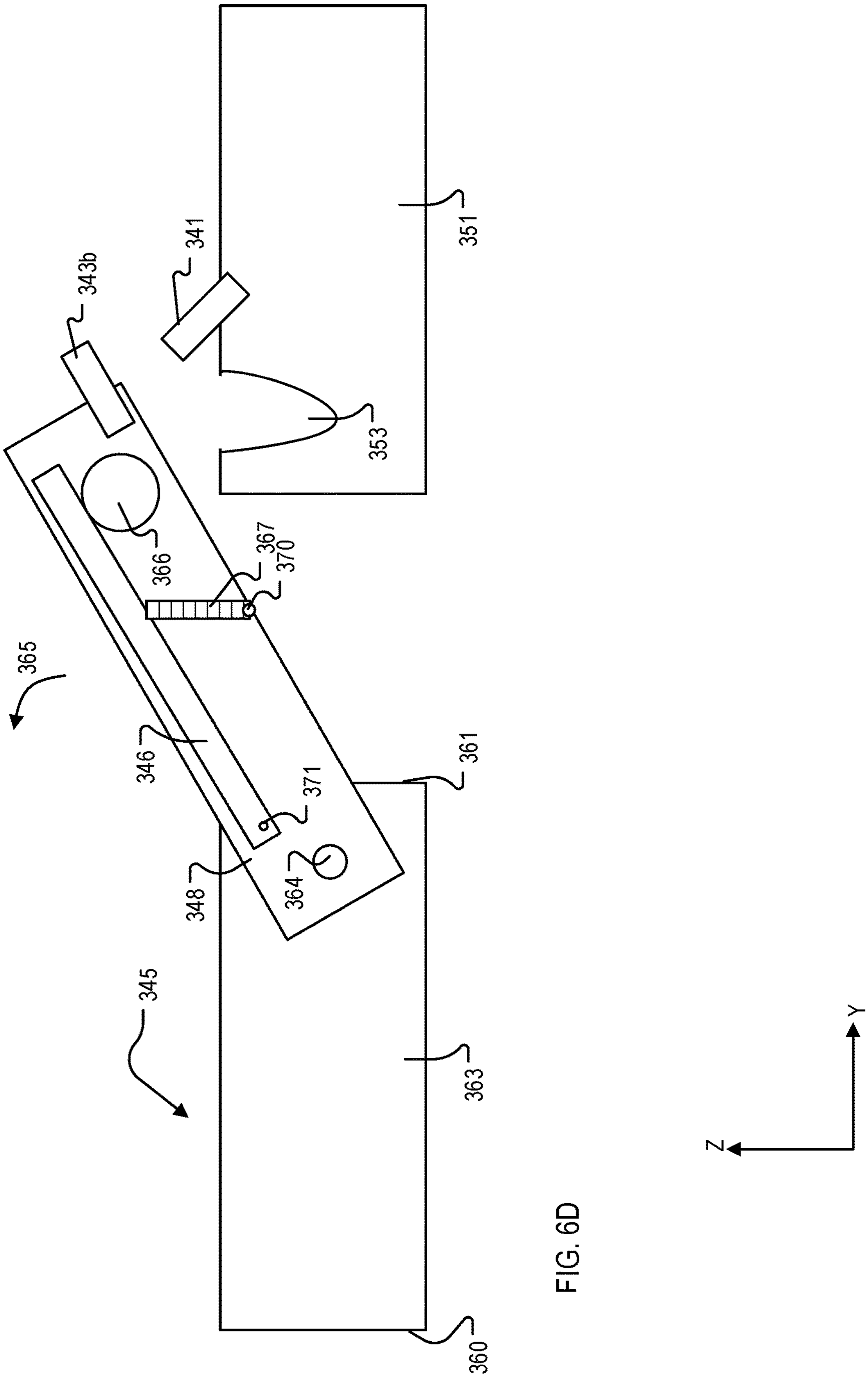
FIG. 6D is a side view of the switch module of FIG. 3 in a fully open configuration.

Referring to FIG. 6D, the contact portions 347 and 348 move along the arc 365 until the switch module 340 is fully open. No current flows in the switch module 340.

The configuration of the arcing contact 346 and the ability to conduct current in the initial part of the opening operation may reduce contact welding on the stationary contact 344 and/or the contact portions 347, 348, thereby extending the life of the switch module 340. For example, when the contact portions 347, 348 move out of physical contact with the stationary contact 344 at the beginning of the opening operation, an air gap is formed between the contact portion 348 and the surface 368 of the stationary contact 344 and between the contact portion 347 and the surface 351 of the stationary contact 344. Without the secondary arcing contact 346, current flowing in the switch module 340 at the initiation of the opening procedure (for example, when the switch module 340 opens due to an overload or short circuit condition) would arc in the air gap (which has a very high impedance). Small (for example, ones, tens, or hundreds of micron) contact weld regions would be created on the surfaces 351 and 368 and/or on the contact portions 347, 348. This contact welding affects the electrical properties and integrity of the surface and may reduce the lifetime and/or hinder performance of the switch module.

On the other hand, the switch module 340 includes the secondary arcing contact 346. As discussed above, the secondary arcing contact 346 provides a path for electrical current that flows during the opening procedure and before the arc contacts 343*a*, 343*b*, and 341 are available provide a current path. Examples of such current include, for example, fault current that arises from an overload or short circuit condition. In this way, the secondary arc contact 346 improves the performance of the switch module 340 and/or extends the usable life of the switch module 340. Moreover, in some implementations, the elastic connection 367 is positioned such that the force F applied by the elastic connection 367 is maximum when the switch module 340 is in the closed position. This provides further assurance that the secondary arcing contact 346 remains in physical and electrical contact with the arcing contact 341 to provide a path for fault current when the pressure apparatus 366 releases the first and second contact portions 347, 348 at the beginning of the opening operation.

These and other implementations are within the scope of the claims.

What is claimed is:

1. A switch comprising:

a first stationary electrical contact;

a second stationary electrical contact;

a movable electrical contact assembly attached to the second stationary electrical contact and configured to separate from the first stationary electrical contact to open the switch;

a first arcing contact on the movable electrical contact assembly;

a second arcing contact on the first stationary electrical contact; and a secondary arcing contact electrically connected to the movable electrical contact assembly, wherein the secondary arcing contact is connected to the second arcing contact when the switch is closed and remains connected to the second arcing contact during at least part of an opening operation of the switch.

2. The switch of claim 1, wherein the secondary arcing contact is attached to the movable electrical contact assembly with an elastic connection, and the elastic connection is configured to apply a force to the secondary arcing contact.

3. The switch of claim 2, wherein the force is greatest when the switch is closed.

4. The switch of claim 2, wherein the secondary arcing contact extends from a first end to a second end, the first end is attached to a rotation point, the second end is connected to the second arcing contact when the switch is closed and remains connected to the second arcing contact during at least part of the opening operation of the switch, and the elastic connection is attached to the secondary arcing contact between the first end and the second end.

5. The switch of claim 1, wherein the secondary arcing contact is electrically connected to the movable electrical contact assembly by a braided electrical wire.

6. The switch of claim 1, wherein the first arcing contact, the second arcing contact, and the secondary arcing contact have a lower electrical conductivity than the first stationary electrical contact, the second stationary electrical contact, and the movable electrical contact assembly.

7. The switch of claim 1, wherein the movable electrical contact assembly is attached to the second stationary electrical contact at a pivot point, the movable electrical contact assembly is configured to rotate about the pivot point in an arc, and the secondary arcing contact remains connected to the second arcing contact at least until the first arcing contact connects to the second arcing contact.

8. The switch of claim 1, wherein the movable electrical contact assembly comprises: a first contact portion, and a second contact portion, wherein the first contact portion is on a first side of the second stationary electrical contact, and the second contact portion is on a second side of the second stationary electrical contact.

9. The switch of claim 1, further comprising a pressure apparatus coupled to the movable electrical contact assembly, and, wherein, the opening operation begins when the pressure apparatus is released.

10. The switch of claim 9, further comprising an operating interface coupled to the pressure apparatus, the operating interface being operable to release the pressure apparatus.

11. The switch of claim 1, further comprising a support, and wherein the first stationary electrical contact and the second stationary electrical contact are mounted on the support in a line.

12. An apparatus comprising:

a movable electrical contact assembly configured to move relative to a stationary electrical contact;

an arcing contact attached to the movable electrical contact assembly;

a secondary arcing contact electrically connected to the movable electrical contact assembly; and an elastic connection attached to the movable electrical contact assembly and the secondary arcing contact, wherein the movable electrical contact assembly comprises a first contact portion and a second contact portion, and the secondary arcing contact is between the first contact portion and the second contact portion.

13. The apparatus of claim 12, wherein the secondary arcing contact is electrically connected to the movable electrical contact assembly through an electrically conductive element.

14. The apparatus of claim 13, wherein the electrically conductive element is flexible.

15. The apparatus of claim 12, wherein the secondary arcing contact and the arcing contact comprise a first electrically conductive material, and the movable electrical contact assembly comprises a second electrically conductive material that has a higher electrical conductivity than the first electrically conductive material.

16. A system comprising:

a stationary electrical contact;

a movable electrical contact assembly configured to move relative to the stationary electrical contact;

a first arcing contact on the movable electrical contact assembly;

a second arcing contact on the stationary electrical contact;

an electrical element electrically connected to the movable electrical contact assembly;

an elastic connection attached to the movable electrical contact assembly; and a secondary arcing contact, wherein the secondary arcing contact is electrically connected to the electrical element and is pivotally mounted to the movable electrical contact assembly, and the elastic connection is attached to the movable electrical contact assembly and the secondary arcing contact.

17. The system of claim 16, wherein the movable electrical contact assembly comprises a first contact portion and a second contact portion, the electrical element is attached to one or more of the first contact portion and the second contact portion, the elastic connection is attached to one of the first contact portion and the second contact portion, and the secondary arcing contact is between the first contact portion and the second contact portion.

18. The system of claim 16, wherein the elastic connection is configured to apply a force to the secondary arcing contact such that the secondary arcing contact remains in contact with the second arcing contact when the movable electrical contact assembly begins to separate from the stationary electrical contact.

19. The system of claim 16, wherein the secondary arcing contact is configured to provide part of a current path when the movable electrical contact assembly begins to separate from the stationary electrical contact.

20. The system of claim 16, wherein the secondary arcing contact, the first arcing contact, and the second arcing contact have a lower electrical conductivity than the movable electrical contact assembly and the stationary electrical contact.

* * * * *